United States Patent [19]

Graber

[11] Patent Number: 4,711,516

[45] Date of Patent: Dec. 8, 1987

[54] OPTICAL SLIP RING

[75] Inventor: David W. Graber, Millington, Mich.

[73] Assignee: General Motors Corporation, Detroit, Mich.

[21] Appl. No.: 323,757

[22] Filed: Nov. 23, 1981

[51] Int. Cl.$^4$ .......................... G02B 6/26; G02B 6/42
[52] U.S. Cl. .................................................. 350/96.15
[58] Field of Search ...................... 350/96.15; 250/227, 250/237, 551; 455/602

[56] References Cited

U.S. PATENT DOCUMENTS 4,109,998  8/1978  Iverson ............................. 350/96.15

*Primary Examiner*—William L. Sikes
*Assistant Examiner*—Robert E. Wise
*Attorney, Agent, or Firm*—Warren D. Hill

[57] ABSTRACT

To couple light signals between two relatively rotating parts, two rings of transparent material, each mounted on one of the parts, are provided on a common axis and have a slight spacing between their rings which is filled with an index matching fluid. Recesses in each ring are provided to receive light emitters or detectors, respectively. Each recess defines a curved wall serving as a light collection or focusing lens which serves as a window into or out of a ring. The assembly is completed by a pair of coaxial spacers or retainers each of which are mounted on one of the relatively rotating parts and also secured to one of the transparent rings. Light coupled into one of the rings through a window is transmitted by the index matching fluid to the other ring and it is emitted from a window of that ring.

5 Claims, 5 Drawing Figures

OPTICAL SLIP RING

This invention relates to an optical slip ring for coupling light signals between two relatively rotating parts.

It is desirable in many instances to use optical signals where previously electrical signals had been used because optical signal transmission can be accomplished free of electromagnetic interference which might provide spurious signals in the case of electrical signal transmission. Also, very high optical signal densities are readily obtained. In an application where it is desirable to transmit such signals from one part which rotates relative to another, for example, a vehicle steering wheel mounted on a steering column, it is desired to provide an optical slip ring for efficiently conveying optical signals between those parts. This would, in the case of the steering wheel, allow switch or other control functions to be mounted on the steering wheel and the control signal therefrom to be transmitted to the vehicle through the steering column even while the steering wheel is experiencing rotation.

It is, therefore, an object of this invention to provide an optical slip ring for coupling light signals between two relatively movable parts.

The invention is carried out by providing a pair of transparent rings mounted coaxially and slightly spaced, the space being filled with an index matching fluid to facilitate light transmission from one ring to another. Recesses in outer surfaces of the rings define windows for coupling light into and out of each ring respectively and a pair of retaining rings each connected to a respective one of the transparent rings and to one relatively rotatable part for effecting relative rotation between the transparent rings when the parts are rotated.

The above and other advantages will be made more apparent from the following specification taken in conjunction with the accompanying drawings wherein like reference numerals refer to like parts and wherein.

Figure 1:
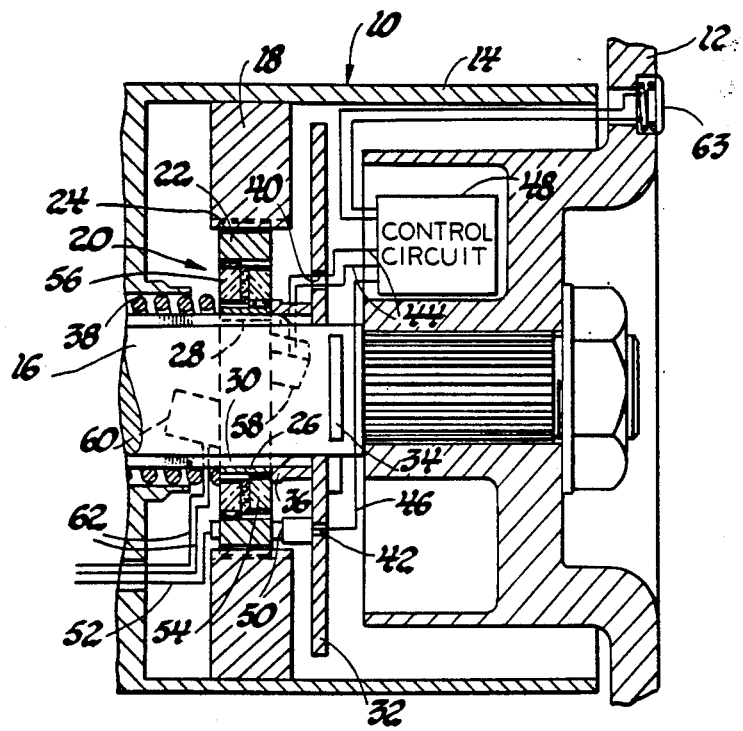
FIG. 1 is a cross-sectional view of part of a vehicle steering column incorporating an optical slip ring assembly according to the invention.

FIG. 1 illustrates the top of a steering column 10 and a steering wheel 12 in cross-section. The stationary column housing 14 surrounds a steering shaft 16 which is coupled to the steering wheel 12 for rotation within the stationary housing 14. An optic ring carrier 18 comprises several supports of insulating material secured to the housing 14 and extending inwardly toward the steering shaft 16. An optical slip ring assembly 20 has an outer conductive retaining ring 22 engaging the carrier at keyways 24 so that the retaining ring 22 is held stationary with respect to housing 14. An inner retaining ring 26 is supported by the steering shaft 16 and has keyways 28 engaging splines 30 on the steering shaft thereby effecting rotation of the inner retaining ring 26 with the rotation of the shaft 16. A lock plate 32 mounted on the shaft 16 for rotation therewith is retained against outward axial movement by a key 34. A spacer 36 between the lock plate 32 and the inner retainer ring 26 positions the optical slip ring assembly 20 axially and resists the thrust of a coil spring 38 surrounding the shaft 16 and pushing against the inner retainer 26. The lock plate has apertures 40 and 42 which allow the passage of electrical conductors 44 and 46, respectively, extending between the slip ring assembly and a control circuit 48 mounted in the steering wheel. An electrical slip ring brush 50 is secured on the lock plate 32 adjacent the aperture 42 and aligned with the outer retainer ring 22. The brush 50 which is connected to the conductor 46 slides along the retainer ring 22 during wheel rotation so that the retainer ring serves as a slip ring. Retainer ring 22, in turn, is connected to a power supply, not shown, by a conductor 52 which extends down the steering column. A pair of transparent acrylic rings 54 and 56 are held by the retainers 26 and 22, respectively, and serve as the light signal transmission medium of the optical slip ring assembly. A light emitting diode assembly 58 is secured to the surface of the transparent ring 54 and is connected to the control circuit 48 by the conductors 44. A photodetector assembly 60 mounted on the transparent ring 56 is connected to conductors 62, which extend down the steering column. The control circuit 48, thus, is powered through the electrical slip ring arrangement and conductor 46. The control circuit interprets signals from actuators represented by a push button switch 63 on the steering wheel and provide output signals on the conductors 44 which energize an LED which sends light signals through the optical slip ring assembly to a detector 60 thereby providing transmission of control signals from the rotating steering wheel to the stationary steering column.

Figure 2:
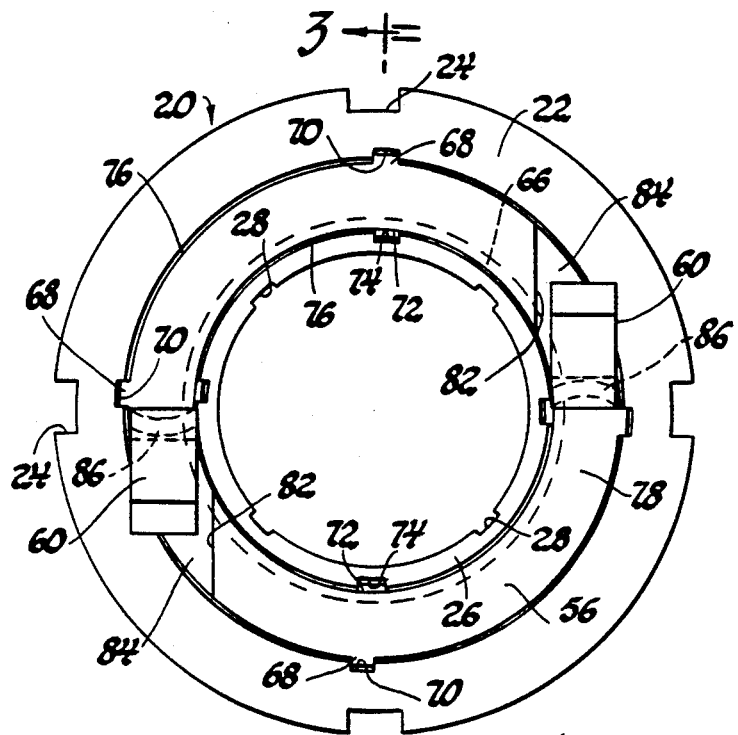
FIG. 2 is a plan view of a preferred embodiment of the optical slip ring according to the invention.
Figure 3:
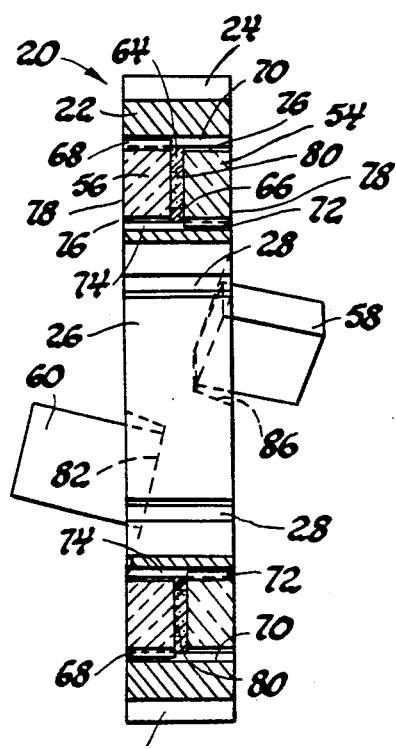
FIG. 3 is a detailed cross-sectional view of the optical slip ring taken along lines 3—3 of FIG. 2.
Figure 4:
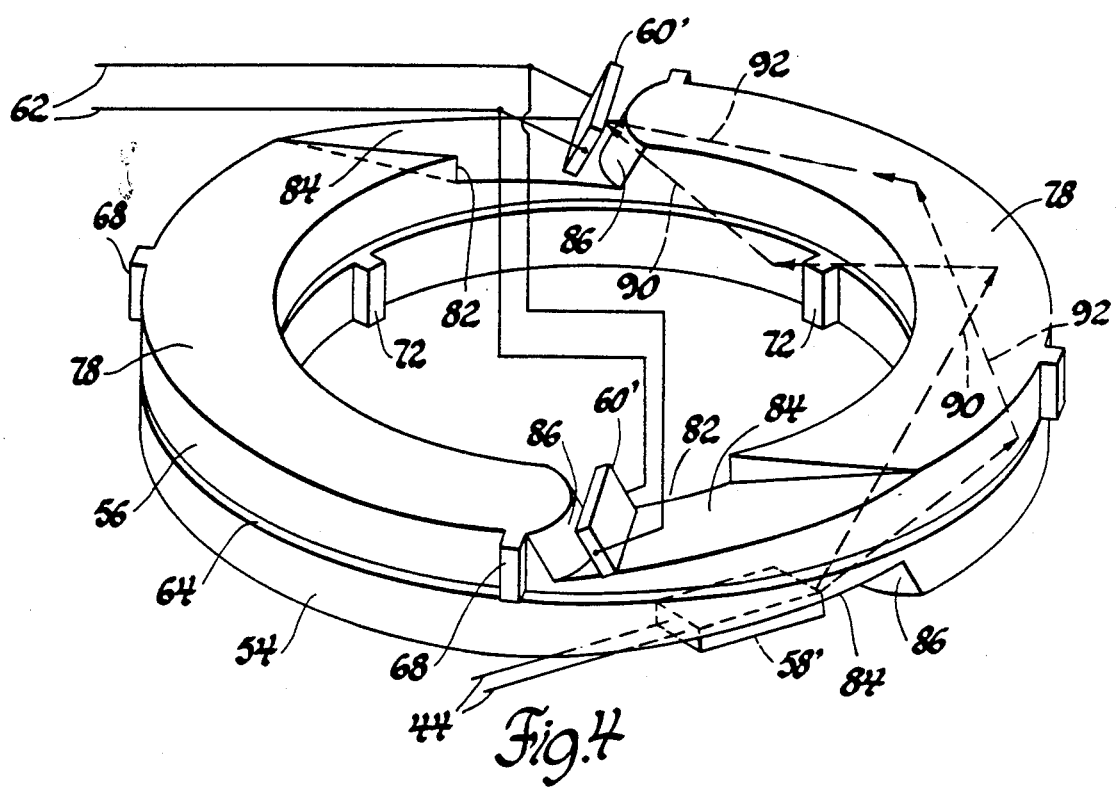
FIG. 4 is an isometric view of the transparent rings of the optic slip ring diagrammatically illustrating the optical coupling between photoemitters and photodetectors associated with the optic slip ring.

Referring to FIGS. 2, 3 and 4, the transparent rings 54 and 56 are essentially similar in shape and are nested coaxially and are axially separated by a space 64 filled with an index matching fluid. Such a fluid will have an index of refraction very close or equal to the index of refraction of the acrylic rings 54, 56. Various silicone compositions have been found to be satisfactory for this purpose and in particular a commercially available index matching fluid having a consistency of petroleum jelly provides a clear lossless transmission path from one transparent ring to the other and when applied in a layer of 0.002 to 0.003 inch thick allows free rotation of the transparent rings. A thin mylar spacer or washer 66 between the rings maintains the desired spacing of 0.002 to 0.003 inch. The transparent ring 56 is connected to the retaining ring 22 by a plurality of keys 68 integral with the ring 56 which engage corresponding keyways 70 in the retaining ring 22. Since the retaining ring 22 is fixed to the supports 18 by keyways 24, the retaining ring 22, as well as the transparent ring 56, are held stationary. Similarly, the transparent ring 54 is connected to the retaining ring 26 by a plurality of keys 72 integral with the ring 54 and engaging complementary keyways 74 in the retaining ring 26. Since the retaining ring 26 is keyed to both the shaft 16 and the transparent ring 54, the ring 54 rotates with the steering shaft. The retaining rings 24 and 26 and the transparent rings 54 and 56 are so dimensioned that the respective keys hold the several rings out of contact with one another except at the keyways thereby allowing a very small air gap 76 as shown in FIG. 3 at the cylindrical boundaries of the rings 54 and 56. Thus, the outer surfaces of the transparent rings comprising the cylindrical surfaces and the exposed flat surfaces 78 are essentially surrounded by air while the planar inner surface 80 of each ring is covered with index matching fluid. The index of refraction of the acrylic ring 54 is high compared to that of the air so that for light within the rings total internal reflection occurs at the outer surfaces of the rings while no reflection occurs at the inner surface 80 covered by index matching fluid. Consequently, once light is coupled into the optical slip ring assembly through an entrance window, it is contained within the acrylic rings and travels throughout the rings until it exits from an exit window.

The light coupling means includes entry and exit windows which are formed, as shown in FIGS. 2, 3 and 4, by recesses 82 in the flat exposed surface 78 of each ring 54 and 56. Each recess comprises a flat ramp 84 inclined at a small angle, say, 15° to the surface 78 which meets a curved wall 86 extending from the terminus of the ramp 84 to the exposed surface 78. The wall 86 lies at an angle of about 60° to the flat exposed surface 78. The LED assemblies 58 and the photodiode assemblies 60 include brackets which are cemented to the flat ramp 84 of a recess in order to position the LED or photodiode, respectively, at an entry or exit window. The curved wall 86 when used as a light entry window serves to collect light from the associated LED 58' which is located in the recess of the ring 54 and focuses that light into the ring 54. When the light after undergoing a number of reflections internally is finally emitted at an exit window, the lens effect of the window focuses that light onto the photodiode or detector 60' positioned in the recess adjacent the exit window.

FIG. 4 illustrates by a light ray diagram typical light paths from an LED to a photodiode. For example, a light ray 90 emitted by the LED 58' is focused by the entry window 86 at an angle directed toward the ring 56. The ray passes through the space 64 filled with index matching fluid, internally reflects from the flat surface 78 of the ring 56, is redirected again through the space 64 and reflects off the exposed flat face 78 of the ring 54 and is again directed through the space 64 and out through an exit window onto a photodiode 60'. Another light ray 92 from the LED 58' passes through the space 64 and reflects twice from the outer cylindrical wall of the ring 56 and is then finally directed through the window 86 onto the photodiode 60'. These are some typical light paths occurring within the optic ring assembly. Reflections can also occur at the inner cylindrical surface of the rings, however such reflections are not common. The drawing figures suggest one entry window in the ring 54 and two exit windows each containing a detector 60' in the ring 56. Another design includes two entry windows each having a light emitting diode and two exit windows while still another feasible design includes two entry windows and a single exit window. These are matters of design optimization to ensure that regardless of the degree of optical slip ring rotation an adequate light signal is transmitted from the emitter to the detector. As shown in FIG. 4, when two photodiodes 60' are used, they are connected in parallel so that the output signal is strengthened. Similarly, if two LED's are used, they will likewise be connected in parallel to emit identical signals but to assure a stronger signal transmission at any given degree of rotation of the optical slip ring assembly.

Figure 5:
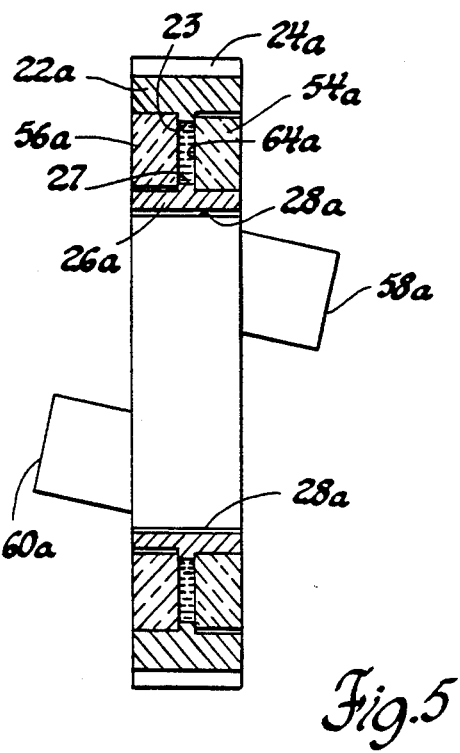
FIG. 5 is a cross-sectional view of another embodiment of optical slip rings according to the invention.

FIG. 5 illustrates another embodiment of the invention wherein the parts are slightly modified as indicated by the same reference numerals affixed with an "a" suffix. The transparent rings 54a and 56a are not keyed to their respective retaining rings 26a and 22a but rather are adhesively bonded thereto by an adhesive (not shown) having an index of refraction lower than that of the transparent rings which thereby maintains the necessary internal reflection of light within each ring. A central rib 23 on the inner surface of the retaining ring 22a extends between the rings 54a and 56a to serve as a seal and a spacer while a similar rib 27 is formed on the outer circumference of the retaining ring 26a to serve the same purpose. With such a seal a low viscosity index matching fluid in the space 64a such as a light silicone oil can be used.

It will thus be seen that the optical slip ring according to this invention is a compact and durable assembly for the high fidelity transmission of light between relatively rotating parts.

The embodiments of the invention in which an exclusive property or privilege is claimed are defined as follows:

1. An optical slip ring for coupling light signals between two relatively rotating parts including
    first and second rings of homogenous transparent material, each ring having an inner surface slightly spaced from the inner surface of the other ring and an outer surface at least partially surrounded by a medium having a lower index of refraction than the ring to facilitate internal reflection of light within the ring,
    means for facilitating efficient light transmission from one ring to another,
    coupling means in the outer surfaces of the transparent rings for coupling light into and out of the rings respectively, and
    a pair of coaxial retainers, each fixedly mounted on one of the relatively rotating parts for movement therewith and secured to a respective one of the transparent rings for effecting relative rotation of the rings,
    whereby light coupled into the first transparent ring passes through that ring, across the space between the rings, through the second transparent ring and is coupled out of the second ring irrespective of the rotation of the parts.

2. An optical slip ring for coupling light signals between two relatively rotating parts including
    first and second rings of homogenous transparent material, each ring having an inner surface slightly spaced from the inner surface of the other ring and an outer surface at least partially surrounded by a medium having a lower index of refraction than the ring to facilitate internal reflection of light within the ring,
    means for facilitating efficient light transmission from one ring to another,
    coupling means in the outer surfaces of the transparent rings, the coupling means comprising at least one recess defining a window in the outer surface of each ring for coupling light into and out of the rings respectively, each recess being adapted to receive a light emitter or a light detector adjacent a window, and
    a pair of coaxial retainers, each fixedly mounted on one of the relatively rotating parts for movement therewith and secured to a respective one of the transparent rings for effecting relative rotation of the rings, whereby light coupled into the first transparent ring passes through that ring, across the space between the rings, through the second transparent ring and is coupled out of the second ring irrespective of the rotation of the parts.

3. An optical slip ring for coupling light signals between two relatively rotating parts including first and second rings of homogenous transparent material, each ring having an inner surface slightly spaced from the inner surface of the other ring and an outer surface at least partially surrounded by a medium having a lower index of refraction than the ring to facilitate internal reflection of light within the ring, a transparent fluid having an index of refraction substantially the same as that of the rings bridging the spaced inner surfaces for facilitating efficient light transmission from one ring to another, coupling means in the outer surfaces of the transparent rings for coupling light into and out of the rings respectively, and a pair of coaxial retainers, each fixedly mounted on one of the relatively rotating parts for movement therewith and secured to a respective one of the transparent rings for effecting relative rotation of the rings, whereby light coupled into the first transparent ring passes through that ring, across the space between the rings, through the second transparent ring and is coupled out of the second ring irrespective of the rotation of the parts.

4. An optical slip ring for coupling light signals between two relatively rotating parts including first and second coaxial rings of homogenous transparent material, each ring having a planar inner surface slightly spaced axially from the inner surface of the other ring and an outer surface at least partially surrounded by a medium having a lower index of refraction than the ring to facilitate internal reflection of light within the ring, a transparent fluid having an index of refraction substantially the same as that of the rings bridging the spaced inner surfaces for facilitating efficient light transmission from one ring to another, coupling means in the outer surfaces of the transparent rings, the coupling means comprising at least one recess defining a window in the outer surface of each ring for coupling light into and out of the rings respectively, each recess being adapted to receive a light emitter or a light detector adjacent a window, and a pair of coaxial retainers, each fixedly mounted on one of the relatively rotating parts for movement therewith and secured to a respective one of the transparent rings for effecting relative rotation of the rings, whereby light coupled into the first transparent ring passes through that ring, across the space between the rings, through the second transparent ring and is coupled out of the second ring irrespective of the rotation of the parts.

5. An optical slip ring for coupling light signals between two relatively rotating parts including first and second coaxial rings of homogenous transparent material, each ring having a planar inner surface slightly spaced axially from the inner surface of the other ring and an outer surface at least partially surrounded by a medium having a lower index of refraction than the ring to facilitate internal reflection of light within the ring, the outer surface including cylindrical portions and a substantially planar portion, coupling means in the outer surfaces of the transparent rings the coupling means comprising at least one recess in the outer substantially planar portion of each ring, each recess defining a ramped surface extending from the said planar portion toward the inner surface to a ramp terminus and a curved lens extending from the ramp terminus to the planar portion for coupling light into and out of the rings respectively, and a pair of coaxial retainers, each fixedly mounted on one of the relatively rotating parts for movement therewith and secured to a respective one of the transparent rings for effecting relative rotation of the rings, whereby light coupled into the first transparent ring passes through that ring, across the space between the rings, through the second transparent ring and is coupled out of the second ring irrespective of the rotation of the parts.

* * * * *